(12) United States Patent
Parsons

(10) Patent No.: US 7,457,197 B1
(45) Date of Patent: Nov. 25, 2008

(54) REDUCTION OF LOW FREQUENCY VIBRATIONAL NOISE IN TOWED ARRAYS

(75) Inventor: Alan T Parsons, Weymouth (GB)

(73) Assignee: QinetiQ Limited, London (GB)

( * ) Notice: Subject to any disclaimer, the term of this patent is extended or adjusted under 35 U.S.C. 154(b) by 0 days.

(21) Appl. No.: 07/566,700

(22) Filed: Jul. 26, 1990

(30) Foreign Application Priority Data

Jul. 28, 1989 (GB) .................................. 8917275.3

(51) Int. Cl.
*G01S 3/801* (2006.01)
(52) U.S. Cl. ........................................ 367/106; 367/901
(58) Field of Classification Search ................. 367/130, 367/106, 901, 15
See application file for complete search history.

(56) References Cited

U.S. PATENT DOCUMENTS

| 4,509,151 A | 4/1985 | Anderson | 367/118 |
| 4,737,937 A | 4/1988 | Keckler et al. | 367/20 |

FOREIGN PATENT DOCUMENTS

| GB | 1230701 | 5/1971 |
| GB | 1435125 | 5/1976 |
| GB | 2145226 A | 3/1985 |
| GB | 2366618 A * | 3/2002 |

OTHER PUBLICATIONS

Journal of the Acoustical Society of America, vol. 75, No. 6, Jun. 1984 (New York), pp. 1837-1847 ("Hybrid time-Delay/Phase-Shift Digital (cont.) Beamforming for Uniform Collinear Arrays", R. A. Gabel and R.R. Kurth, see especially the sub-arrays in Figure 2, p. 1839).

* cited by examiner

*Primary Examiner*—Dan Pihulic
(74) *Attorney, Agent, or Firm*—Nixon & Vanderhye P.C.

(57) ABSTRACT

Low frequency vibration induced noise is reduced in a towed sonar array of the type comprising a number of oil-filled modules joined end to end with each module housing a plurality of hydrophones by arranging that the signal output from each hydrophone in an array is equally weighted at low frequencies to form a single channel. Beamforming is then carried out by applying different weights to the different module channels. High modulus internal strength members are included in each module to resist anti-phase vibration of the couplings at the end of the module. The hydrophone spacing and the coupling lengths are both made small compareed to the module length to improve vibration noise reduction.

8 Claims, 3 Drawing Sheets

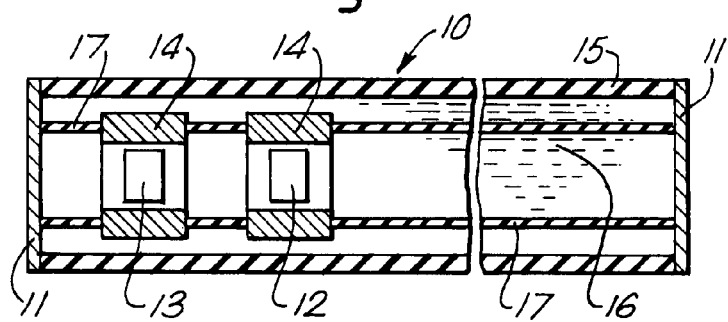
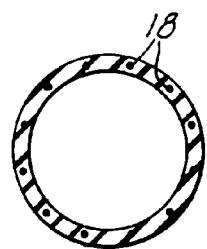
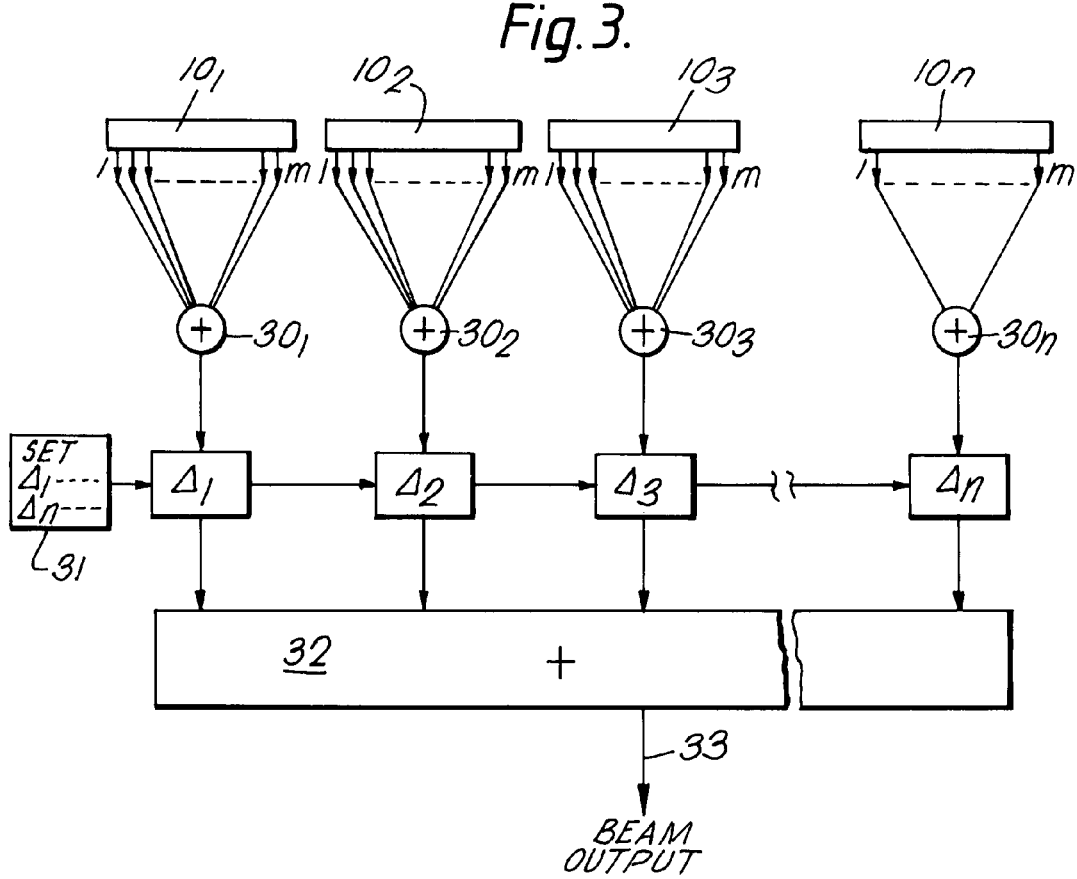

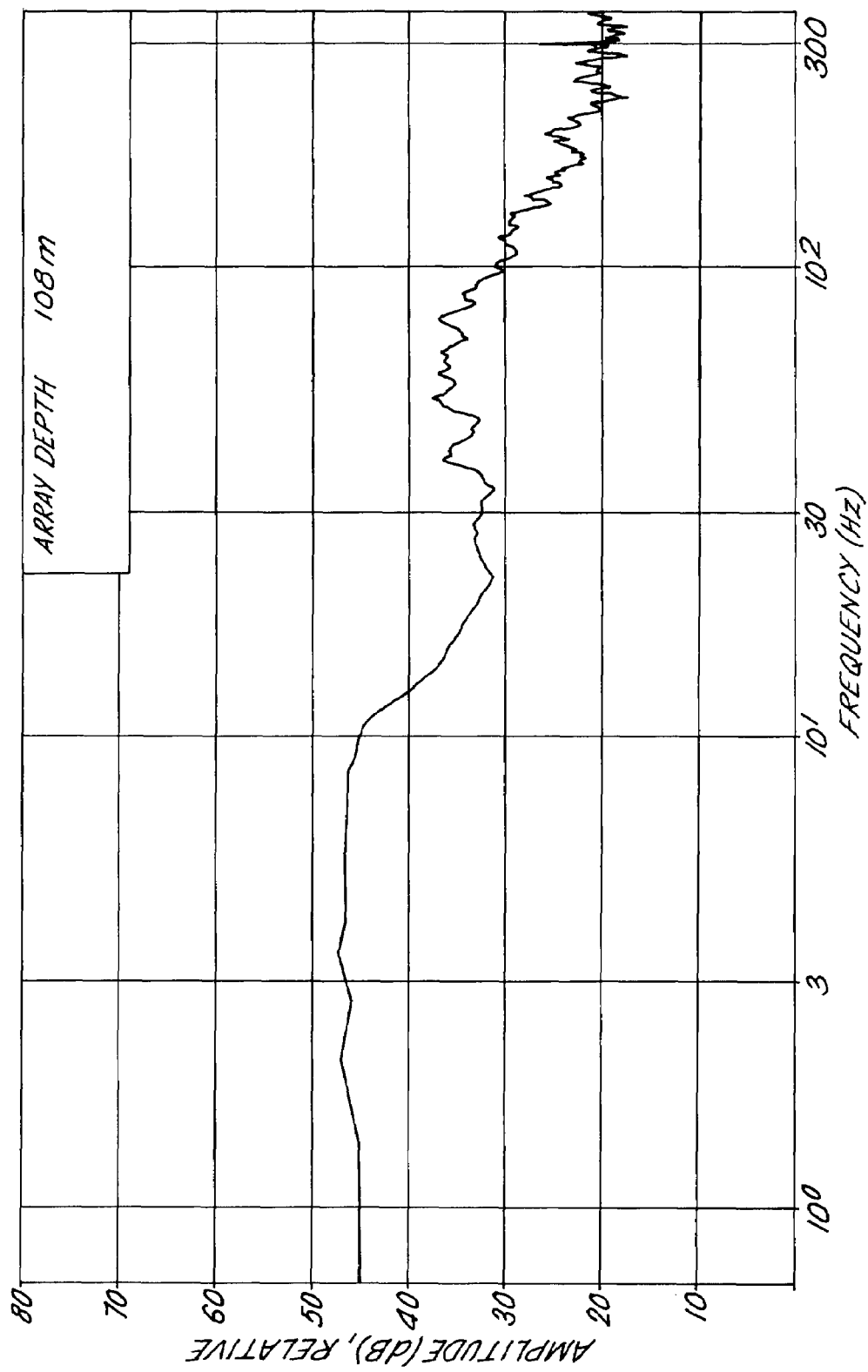

REDUCTION OF LOW FREQUENCY VIBRATIONAL NOISE IN TOWED ARRAYS

BACKGROUND OF THE INVENTION

1. Field of the Invention

The invention relates to linear arrays of sonar hydrophones adapted for towing behind ships and submarines and in particular to the reduction of the influence of variational noise on low frequency performance.

2. Discussion of Prior Art

The acoustic part of a towed array of the type referred to herein comprises a number of sections, or modules, of long oil-filled hose containing hydrophones. Each module contains within the oil cavity, high modulus, longitudinal strength members, hereinafter referred to as internal strength members, whose main purpose is to support the tow load. In addition, there may exist longitudinal reinforcement embedded in the hose wall to prevent the latter from stretching. The two ends of each module are terminated in solid couplings which serve to join the sections together and to transfer the tow load from the hose wall to the internal strength members. It follows from this construction that if one of the couplings is vibrating longitudinally, whatever the source, then all the other couplings will be vibrating in some measure, since they are linked together by the high modulus internal strength members.

The primary sources of vibration are strumming of the tow cable, and snatching of the tow cable at the tow point when the towing vessel is in a heavy sea. Current methods for reducing the vibration are either to fair the cable or to insert vibration isolation modules between the cable and the array. These methods are not always totally efficient, and even when they are, there still exists a threshold level of vibration generated in the array itself by the action of the turbulent boundary layer.

It is known that the internal strength members are important transmitters of low frequency, longitudinal vibration. This sets the couplings into vibration which act as discrete sources of bulge waves (sometimes known as breathing waves) and longitudinal hose-wall elastic waves, each of which generate pressures inside the hose. Since these waves have long wavelengths at low frequencies they can propagate to the centre of a module with little attenuation from hose-wall damping. Reflections from adjacent couplings, partial reflections from internal components, and standing wave effects may also be important.

It is evident that the resultant self-noise field due to low frequency vibration is not spatially homogeneous. In other words, the self-noise levels on single channels vary with position in the module. As a consequence, the familiar concept of wavenumber space that is so useful for interpreting the characteristics of the homogeneous pressure response at high frequencies, is no longer very useful at low frequencies. A related problem is that the spatial non-homogeneities render difficult any simple estimation of the array gain against self-noise to be applied to single channel levels.

SUMMARY OF THE INVENTION

The object of the present invention is to provide a means to improve the low frequency performance of towed sonar arrays when they are limited by the effects of vibration.

The invention provides a data processor for connection to a linear towed sonar array of the type hereinbefore defined, the processor being connectable to the hydrophones of the array such that at low frequencies the outputs from all the hydrophones in each respective module of the towed array are added together with uniform weighting and without relative phase delays so as to form respective single channel outputs.

The important feature of this summed output from each module is that at low frequencies it closely approximates the average internal pressure over the length of the module. The average pressure in the module due to low frequency vibration has been shown by theoretical analysis to approach zero. Thus by treating each module as a single channel the influence of low frequency vibration on the low frequency acoustic signals can be considerably reduced. Beamforming can then be done in a conventional manner with the weighted sum of a number of module outputs formed with phase delays appropriate to a selected beam direction.

Advantageously the Poisson ratio of the hose material is substantially equal to 0.5. This has been shown to reduce still further the effects of vibration on the low frequency performance of the towed array.

Preferably high modulus internal strength members are included in each array module to resist anti-phase vibration of the module end-couplings.

Advantageously the separation of the hydrophones in the array is small compared to the length of the array module, so that the summed outputs of the discrete hydrophones closely approximate a continuous integral. In addition it is preferable that the coupling length is short compared to the module length.

In one arrangement an accelerometer may be provided in each module coupling to measure the respective vibrations at the ends of each module and to produce a signal therefrom to cancel the vibration noise in the hydrophone outputs. In another arrangement, provided the fill-fluid is substantially inviscid and provided the reflection coefficient of the bulkheads for bulge waves and elastic waves are substantially zero, it has been shown from theory that in general for an arbitrary configuration of hydrophones within the module, regardless of the hydrophone spacing, it is possible to choose a set of frequency dependent weights such that the sum of the weighted hydrophone outputs has zero response to low frequency vibration. Thus the invention can be modified by applying frequency-dependent weighs when forming the array beams.

BRIEF DESCRIPTION OF THE DRAWINGS

The invention will now be described by way of example only with reference to the accompanying Drawings of which:

FIGS. 1 and 2 illustrate one module of a towed sonar array in longitudinal and cross sections;

FIG. 3 shows a block diagram of a towed array signal processor arrangement to reduce the effect of vibration on the low frequency spectrum;

FIGS. 4 and 5 show the frequency spectrum of pressure measurements taken at sea from two identical hydrophone channels, FIG. 4 being processed conventionally and FIG. 5 being averaged over the length of a module according to the invention.

DETAILED DISCUSSION OF PREFERRED EMBODIMENTS

Figure 4:
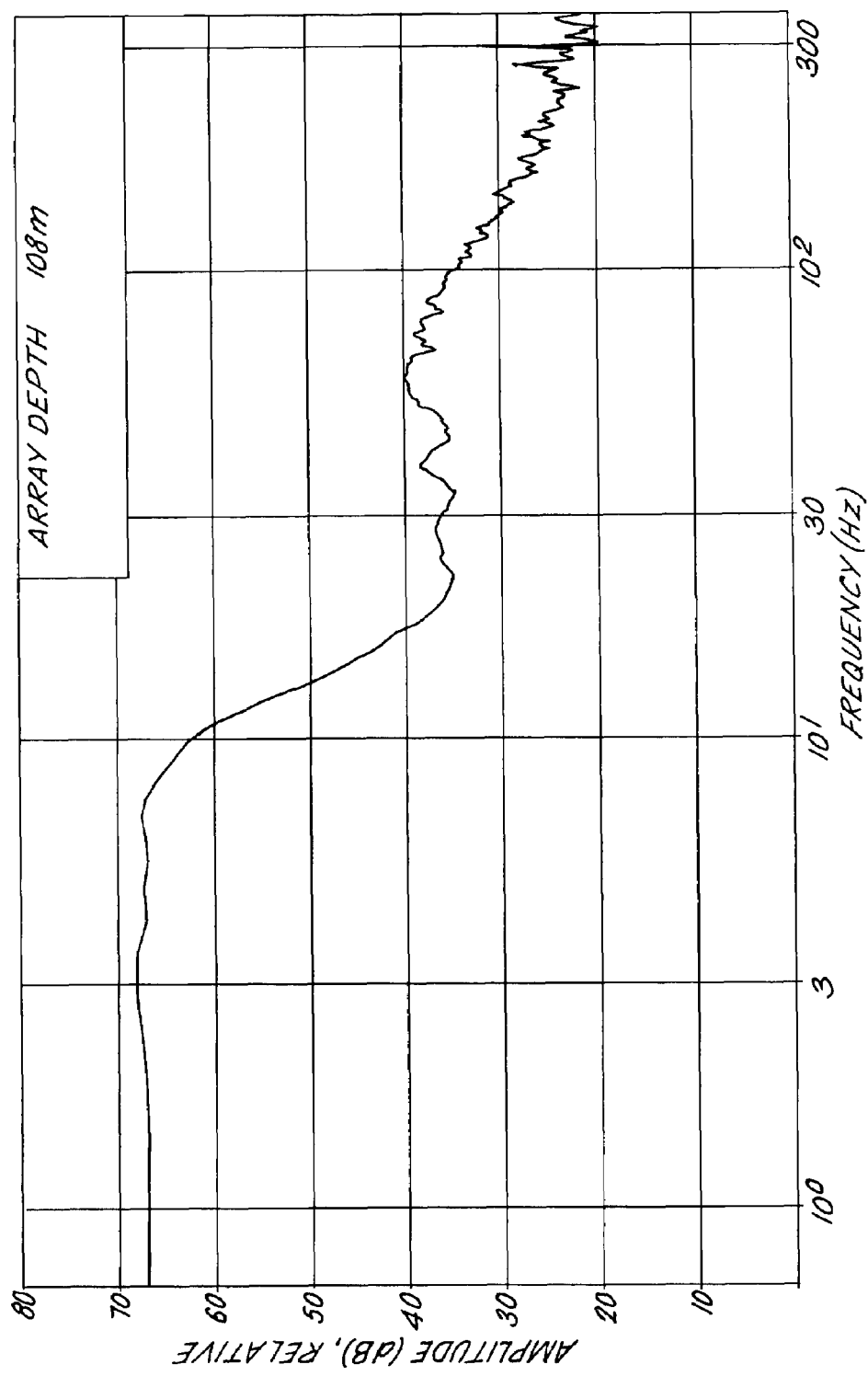

As shown in FIGS. 1 and 2 a towed sonar array comprises a number of similar acoustic modules 10 connected together by end couplings indicated by 11. Hydrophones 12 and their electronics cans 13 are supported on bulkheads 14 spaced along the module within an elastic hose 15 filled with a substantially incompressible fluid 16 to render the module neutrally buoyant. The bulkheads are themselves supported by the internal strength members 17. In one arrangement the hose may contain embedded longitudinal reinforcement 18 to prevent the hose stretching.

The internal strength members 17 readily transmit low frequency longitudinal vibrations which cause the end couplings 11 to vibrate. These vibrations generate bulge waves and longitudinal elastic waves in the hose wall 15, together with associated pressure fluctuations within the fluid 16 which are detected by the hydrophones 12 and constitute self-noise. The constructional features of the array exert a strong influence on the detailed response of the array to vibration. Thus the resulting self-noise is complex and spatially inhomogeneous and is therefore dependent on the position of a hydrophone within the module 10.

FIG. 3 shows a signal processing arrangement which has been devised to minimise the effect of vibration on a towed array operating at low frequencies. The array has n modules $10_1 \ldots 10_n$ each with m hydrophones. The outputs from the m hydrophones in each module are connected to respective adders $30_1 \ldots 30_n$ with no relative phase delays between the outputs from the hydrophones of any given module. Beamforming is then achieved by connecting the outputs from the adders $30_1 \ldots 30_n$ to respective phase delays $\Delta 1 \ldots \Delta n$ which are set by a programmer 31 so as to form a beam in a predetermined direction as will be understood in the art. The phase delayed outputs from adders $30_1 \ldots 30_n$ are then summed by the adder 32 to provide a beam output 33.

The inventor has shown that an anti-symmetry exists in the pressure field inside an array module when the coupling 11 are vibrating in phase. The average pressure over the length of the module due to the vibration is then zero. This condition is assisted by employing high modulus internal strength members which connect together the couplings. In an alternative form the outputs of axial accelerometers located in the couplings could be used to cancel the vibrational component of the pressure response. The cancellation could be achieved deterministically if the hose parameters are known in advance, or it could be achieved adaptively.

The inventor has shown theoretically that the average pressure over the length of an array and the vibration levels at each end are connected by a simple relation. The relation is insensitive to the viscosity and compressibility of the fill-fluid and to the presence of internal strength members and bulkheads. The relation and its outline derivation are given below.

The following notation is employed:

x, r=longitudinal and radial coordinates
w=frequency
u=longitudinal displacement of hose wall
$u_O$=longitudinal displacement of vibrating coupling at x=O
$u_L$=longitudinal displacement of vibrating coupling at x=L
w=radial displacement of hose wall
p=pressure in fill-fluid
E=longitudinal modulus of hose material
$\alpha 2E$=circumferentail modulus of hose material
$\sigma$=Poisson ration of hose material
L=length of module
R=hose radius
$\rho$=density of fill-fluid
v=viscosity of fill-fluid
$c_b$=bulge wave speed
$c_p$=longitudinal elastic wave speed
c=sound speed in fill-fluid The main assumptions are as follows:
1) the motion is circumferentially symmetric so that all dependent variables are functions only of the coordinates x and r.
2) The motion of the fill-fluid is governed by the linearised compressible Navier-Stokes equations and the linearised compressible continuity equation.
3) The motion of the hose wall is governed by the linearised cylindrical thin membrane equations. In particular, it is assumed that the longitudinal and circumferential stresses in the hose wall are related to the strains by $$T_{xx} = \frac{E}{1-\delta^2}\left(\frac{\partial u}{\partial x} + \alpha\delta\frac{w}{R}\right) \quad (1)$$

$$T_{ee} = \frac{E}{1-\delta^2}\alpha\delta\frac{ou}{ox} + \alpha 2\frac{w}{R} \quad (2)$$

The low frequency approximation holds, so that $$Rw/c_b \ll 1, Rw/c_p \ll 1, Rw/c \ll 1 \quad (3)$$

which are expected to be valid in typical arrays at low frequencies of interest. The approximations in Equation (3) imply that the effect of external fluid loading can be neglected and that the internal pressure is essentially constant over the fluid cross-section.

The appropriate boundary conditions are continuity of normal and tangential displacement and continuity of normal and tangential streams at the hose wall, continuity of normal and tangential displacement at the couplings, and continuity of longitudinal hose wall displacement and average longitudinal fluid displacement across a bulkhead.

It can then be shown that the average pressure over the length of a module is:

$$\frac{1}{L}\int_o^L p.dx = 7 \propto b^2\left[\frac{(1-2o/)-iwv(1-\delta^2)/C_{b^2}}{(1-\delta^2)(1-iwv/3c^2)+c_{b2}/C^2}\right]\frac{(u_L-u_o)}{L} \quad (4)$$

It may be verified that in typical situations the effect of viscosity in Equation (4) is small, so that it simplifies to:

$$\frac{1}{L}\int_o^L p.dx = -\frac{\rho c_{b^2}}{(1-\delta^2)+c_{b2}/c^2}\left\{1-\frac{2\delta}{\alpha}\right\}\frac{(u_L-u_o)}{L} \quad (5)$$

This result exhibits no explicit frequency dependence and therefore applies even in the static case.

The result in Equation (5) forms the basic of the present invention. For example, it is evident that the average pressure over the length of the module vanishes if the couplings are vibrating in phase. It is also evident that the result can be readily extended to arrays comprising more than one module.

The significance of the factor $(1-2\sigma/\alpha)$ in Equation (5) will now be discussed.

If the hose is an isotropic medium because no reinforcing material is included then $\alpha=1$ and for many hose materials of interest o is approximately equal to 0.5. Thus the factor $(1-2\sigma/\alpha)$ is close to zero and the average internal fluid pressure p due to the vibrational displacements is also a small quantity. If, however, the hose is anisotropic by virtue of longitudinal reinforcement the hose is much stiffer longitudinally than circumferentially. Hence we would not expect a given circumferential strain to produce much Poisson-coupled longitudinal strain, since this would be resisted by the large longitudinal modulus. Thus by reference to Equation (1) we would expect the product $\alpha\sigma$ to be small. Conversely, we would expect a given longitudinal strain to produce a Posison-coupled circumstantial strain very similar to that in the isotropic case, because the circumferential modulus should be little affected by the presence of longitudinal reinforcement. By reference to Equation (2) this implies that the ratio $\sigma/\alpha$ should remain roughly equal to the Poisson ratio of the matrix material within which the reinforcement is embedded.

It has been further shown that the above arguments can be supported by theoretical analysis. In particular it can be shown that since the Poisson ratios of the component materials cannot be greater than 0.5, the ratio $\sigma/\alpha$ also cannot be greater than 0.5. Thus the factor $(1-2\sigma/\alpha)$ must be positive, as in the isotropic case. Furthermore, if the Posion ratios of the component materials are each close to 0.5 then $(1-2\sigma/\alpha)$ is a small quantity, as in the isotropic case and the average pressure in Equation (5) is also small.

The inventor has also shown that if in the process of beamforming relative phase delays are introduced between hydrophones in any given module, as is done conventionally, then the beamformed response of the array to low frequency vibrational noise is generally greater than that obtained when no such phase delays are included.

Thus it has been shown that:
a) The average internal pressure in the fluid of a towed array is generated by the tendency of the strained hose to produce an internal volume change; a pure translation of the hose produces no stain, no internal volume change, and hence no average internal pressure, even though the pressures at individual points along the array may be non-zero.
b) If the Poisson ratios of the materials of the hose are equal to 0.5 then the average internal pressure response vanishes. This should apply even if the hose contains longitudinal reinforcement.
c) Problems associated with the spatial non-homogeneity of the pressure patterns produced by the elastic waves and bulge waves generated by the vibration are avoided by considering the average pressure over the length of a module.
d) By virtue of (a) and (b) above the response of the array to the effects of low frequency vibration are reduced by summing the hydrophones within a module without phase delays.

The results thus far relate to average pressure in a section terminated at each end by solid diaphragms. In a towed array these diaphragms are the couplings between adjacent modules. The results can be applied equally to a number of modules with the difference in vibrational levels between the ends being related to the average pressure in the modules. Thus the sonar array could conceivably be arranged with modules in groups of 2 or more with constant phase differences applied to the groups.

FIGS. 4 and 5 each show a frequency spectrum of pressure obtained from experiments at sea. They were obtained from two extended hydrophone channels which were identical in design. The channel associated with FIG. 4 was located towards the end of a long module, and therefore was not forming a pressure average over the length of the module. The channel associated with FIG. 5 was located in a short module in such a way that the hydrophones comprising the channel formed an estimate of the average pressure over the length of the module. The two modules were towed adjacent to one another in the same tow configuration. The data were taken at the same time.

The vibrational noise in both Figures is to be seen at frequencies below about 20 Hz. It is evident that the vibrational noise in FIG. 5 is about 20 dB less than the vibrational noise in FIG. 1, illustrating the effectiveness of the invention.

I claim:

1. A sonar detection system comprising:
a linear towed sonar array comprising a plurality of modules joined end to end, each module comprising a flexible fluid-filled hose, each hose including a plurality of linearly spaced hydrophones located within the hose by diaphragms at each end of each hose; and
data processor means for receiving output signals from each hydrophone in the array and for adding together at low frequencies the outputs from all the hydrophones in each respective module of the towed array with uniform weighting and without relative phase delays so as to form respective single channel outputs.

2. A sonar detection system comprising:
a linear towed sonar array comprising a plurality of modules joined end to end, each module comprising a flexible fluid-filled hose, each hose including a plurality of linearly spaced hydrophones located within the hose by diaphragms at each end of each hose; and
data processor means for receiving output signals from each hydrophone in the array and for adding together at low frequencies the outputs from all the hydrophones in each respective module of the towed array with uniform weighting and without relative phase delay so as to form respective single channel outputs, wherein beamforming is done by providing phase delays in the processor such that the weighted sum of a number of module outputs can be formed by means of phase delays appropriate to a selected beam direction.

3. A sonar detection system as claimed in claim 2 wherein a set of frequency dependent weights is selected for beamforming on connection to the module outputs such that the sum of the weighed hydrophone outputs has zero response to low frequency vibration.

4. A sonar detection system comprising a linear towed sonar array comprising a plurality of modules joined end to end and each module comprising a flexible fluid-filled hose housing a plurality of linearly spaced hydrophones, and a data processor comprising means to receive signals from each sensor in the array and wherein at low frequencies the outputs from all the hydrophones in each respective module of the towed array are added together with uniform weighting and without relative phase delays so as to form respective single channel outputs and wherein the hose material is selected such that the Poisson ratio is substantially equal to 0.5.

5. A sonar detection system as claimed in claim 4 wherein an end coupling is provided at the end of each module and high modulus internal strength members are included in each array module to resist anti-phase vibration of the module end-couplings.

6. A sonar detection system as claimed in claim 5 wherein the separation of the hydrophones in the array is small compared to the length of the array module so that the summed outputs of the discrete hydrophones closely approximate a continuous integral.

7. A sonar detection system as claimed in claim 6 wherein the module coupling length is short compared to the module length.

8. A sonar detection system as claimed in claim 5 further including an accelerometer means, in each module coupling, for producing an acceleration signal wherein said data processor means, responsive to said acceleration signal, include means for cancelling vibration noise in said hydrophone outputs.

* * * * *